(12) United States Patent
Boche et al.

(10) Patent No.: US 10,959,088 B2
(45) Date of Patent: Mar. 23, 2021

(54) COMMUNICATION METHOD, MOBILE UNIT, INTERFACE UNIT, AND COMMUNICATION SYSTEM

(71) Applicants: Technische Universität München, Munich (DE); Bayerische Motoren Werke Aktiengesellschaft, Munich (DE)

(72) Inventors: Holger Boche, Berlin (DE); Christian Arendt, Munich (DE)

(73) Assignees: Technische Universität München, Munich (DE); Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/608,506

(22) PCT Filed: Apr. 24, 2018

(86) PCT No.: PCT/DE2018/100392
§ 371 (c)(1),
(2) Date: Oct. 25, 2019

(87) PCT Pub. No.: WO2018/196919
PCT Pub. Date: Nov. 1, 2018

(65) Prior Publication Data
US 2020/0196139 A1 Jun. 18, 2020

(30) Foreign Application Priority Data
Apr. 28, 2017 (DE) ...................... 10 2017 207 185.0

(51) Int. Cl.
*H04M 1/66* (2006.01)
*H04W 12/00* (2021.01)
(Continued)

(52) U.S. Cl.
CPC .......... *H04W 12/0013* (2019.01); *H04L 9/32* (2013.01); *H04L 63/0428* (2013.01); *H04W 4/46* (2018.02);
(Continued)

(58) Field of Classification Search
None
See application file for complete search history.

(56) References Cited

U.S. PATENT DOCUMENTS 7,154,416 B1 * 12/2006 Savage ................... H03M 7/30
341/51
2009/0063861 A1 3/2009 Chu
2016/0119073 A1 4/2016 Vilaipornsawai et al.

FOREIGN PATENT DOCUMENTS

WO WO 2016/155647 10/2016

OTHER PUBLICATIONS

Zhao et al., "Resource Allocation in Device-to-Device Communication underlaid Cellular Network Using SCMA: An Opportunistic Approach," *IEEE/CIC ICCC 2015 Symposium on Wireless Networking and Multimedia* (2015), 6 pages.

* cited by examiner

*Primary Examiner* — Erika A Washington
(74) *Attorney, Agent, or Firm* — Dascenzo Gates Intellectual Property Law, P.C.

(57) ABSTRACT

A communication method (S) for communication between mobile units (10, 20), and in particular between vehicles, in which information transmitted between the mobile units (10, 20) is encoded on the transmitter side by means of an encoder (12-1, 22-1) and is decoded on the receiver side by means of a decoder (12-2, 22-2), and the mobile units (10, 20) are synchronized in communication (S3) with an external interface unit (30) outside the mobile units (10, 20) prior to communication (S5) with one another in that a codebook (Continued)

(Cj) defining or specifying an encoder (12-1, 22-1) and/or a decoder (12-2, 22-2) is determined (S2) by the external interface unit (30) and is communicated (S3) to the mobile units (10, 20).

18 Claims, 6 Drawing Sheets

(51) Int. Cl.
  *H04W 4/46* (2018.01)
  *H04L 9/32* (2006.01)
  *H04L 29/06* (2006.01)
  *H04W 56/00* (2009.01)
  *H04W 88/06* (2009.01)
(52) U.S. Cl.
  CPC ....... *H04W 56/0015* (2013.01); *H04W 88/06* (2013.01); *H04L 2209/34* (2013.01); *H04L 2209/80* (2013.01)

COMMUNICATION METHOD, MOBILE UNIT, INTERFACE UNIT, AND COMMUNICATION SYSTEM

BACKGROUND OF THE DISCLOSURE

The present invention relates to a communication method for communication between mobile units, a mobile unit as such, an interface unit and a communication system. The present invention relates, in particular, to a method for communication between vehicles.

In the automotive engineering domain, but also in mobile devices or units in general, aspects of communication play an increasing part. This requires the set-up and maintenance of secure and robust communication connections as a basic requirement, particularly in relation to vehicle-related ad hoc networks, which are also referred to as Vehicular Ad-hoc NETworks (VANETs). In terms of security aspects, also in the domain of vehicle-to-vehicle communication, different attack scenarios and corresponding security requirements are subjected to closer scrutiny. This also relates, in particular, to aspects of a refusal or blocking of a service, for example in the sense of a Denial of Service (DoS) and the associated Service Availability (SA).

In conventional communication methods, it is problematic that an external interference source, which is also often referred to as a jammer, can seriously affect a communication channel between mobile units either through willful intent or due to technical overlaps in the sense of communication resources. Switching or hopping between transmission channels can provide only a limited solution to the underlying problem, despite the additional outlay in terms of equipment and technology.

SUMMARY OF THE DISCLOSURE

The object of the present invention is to provide a communication method for communication between mobile units and in particular between vehicles, a mobile unit and in particular a vehicle as such with communication capabilities, an interface unit for the communication and a communication system as a whole in which a higher degree of reliability with reduced intervention by interference sources in the communication between mobile units and in particular between vehicles is possible with particularly simple means.

The object is achieved in a method according to the invention for communication between mobile units, in a mobile unit according to the invention, in an interface unit according to the invention, and in a communication system according to the invention.

According to a first aspect, the present invention relates to a communication method for communication between mobile units, and in particular between vehicles, in which information transmitted between the mobile units is encoded on the transmitter side by means of an encoder and is decoded on the receiver side by means of a decoder, and in which the mobile units are synchronized in communication with an interface unit outside the mobile units prior to the communication with one another, whereby a codebook defining or specifying an encoder and/or a decoder is determined and/or specified by the external interface unit and is communicated to the mobile units. A core aspect of the present invention therefore entails performing a synchronization between mobile units which are intended to enter into communication with one another via an external interface which defines and/or specifies the structure of the encoding-decoding units externally for this purpose and communicates the specification to the mobile units. The communication does not necessarily consist in the actual transmission of the codebook which is to be used, but particularly in the transmission of information to the mobile units which is suitable for specifying the codebook and ultimately the encoding-decoding units in the mobile units.

Different possibilities exist for implementing the procedure of determining the defining or specifying codebook.

In a different, additional alternative embodiment of the communication method according to the invention, the defining codebook is determined on the basis of an at least partially deterministic, random and/or pseudorandom algorithm. Particularly a procedure using random or pseudorandom elements makes the success of an attack by an interference source or jammer unlikely or completely prevents an attack (no system breakdown). Random processes or random experiments, in particular, can be used.

In one preferred embodiment of the communication method according to the invention, the defining and/or specifying codebook is determined through the specification by the external interface unit of a value of a synchronization element determining the defining codebook and in particular a value of a synchronization variable. In this way, the codebook of the encoding-decoding units to be specified can be determined with simple means and reliably in the respective mobile units, i.e. with reference to the value of the synchronization element or the synchronization variable.

The communication to the mobile units is preferably performed directly through transmission of the specific value of the determining synchronization element and in particular the synchronization variable from the external interface unit, for example through transmission of a numerical value which is assigned to the codebook and therefore to a corresponding encoding-decoding unit.

Alternatively or additionally, it can be provided that the defining codebook is determined through selection of a defining codebook from a discrete plurality of defining codebooks from a codebook library or codebook unit and in particular through a corresponding selection of a value for the determining synchronization element and the synchronization variable from a discrete number of values, for example in the form of numerals which consecutively number the different codebooks.

Particularly simple relationships are established in a different embodiment of the communication method according to the invention if a plurality of possible defining codebooks and in particular a plurality of possible values for the determining synchronization element and the synchronization variable are in a 1-to-1 correspondence with a corresponding plurality of encoders and/or decoders and in particular with a corresponding plurality of underlying encoding-decoding units. A reliable assignment of the encoding-decoding units to corresponding values of the synchronization variable and the corresponding specifying codebooks in the mobile units on the one hand and in the external interface unit on the other hand is achieved in this way.

At the level of the individual mobile units which are intended to be included in a communication with one another, a particularly high degree of security is created if, according to another preferred embodiment of the communication method according to the invention, the mobile units, on the basis of the defining and/or specifying codebook communicated by the external interface unit and in particular on the basis of the communicated value of the synchronization element and in particular the synchronization variable, select a corresponding codebook from a codebook library or codebook unit which is predefined and in particular stored in the respective mobile unit with a corresponding plurality of possible defining or specifying codebooks and thus define and specify the encoder and/or decoder of the respective mobile unit.

According to a different aspect, the invention further relates to a mobile unit as such which is configured to communicate with other mobile units and/or with an external interface unit using the communication method according to the invention.

A respective mobile unit can have a transceiver, an encoding-decoding unit and a control unit for the control thereof, in particular using the communication method according to the invention.

A mobile unit of this type can be designed, in particular, as a vehicle and preferably as a motor vehicle, for example as a passenger vehicle or as a truck. However, all mobile devices are essentially usable with the communication method according to the invention. This relates, in particular, not only to land-based mobile devices.

According to a further aspect of the present invention, an interface unit as such is also provided which can be designed to communicate with mobile units outside the interface unit, in particular according to the present invention, and/or is configured to communicate with other external interface units using the communication method according to the invention.

In one preferred embodiment, the interface unit according to the invention can generally be designed as an external infrastructure component, as a base station device, as a hotspot, as a roadside unit (RSU), in particular according to the DSRC standard, and/or as a mobile device of a wireless transmission system and in particular of a mobile radiocommunication network.

Finally, according to an additional aspect of the present invention, a communication system as such is also provided. A communication system of this type is designed with at least one first mobile unit, at least one second mobile unit and at least one interface unit outside the mobile units.

The mobile units and the external interface unit are configured according to the invention to carry out a communication method according to the invention through interaction, or to be usable or to be used in such a communication method according to the invention.

It can be provided, in particular, that the first mobile unit and/or the second mobile unit have the structure according to the invention and/or that the external interface unit is designed in a manner according to the invention.

DETAILED DESCRIPTION OF THE DISCLOSURE

Example embodiments and the technical background to the invention are described in detail below with reference to FIGS. 1 to 6. Identical and equivalent and also identically or equivalently acting elements and components are denoted with the same reference numbers. The detailed description of the denoted elements and components is not repeated in every instance of their occurrence.

The presented features and further characteristic can be isolated from one another in any form and can be combined with one another in any way without departing from the core of the invention.

Figure 1:
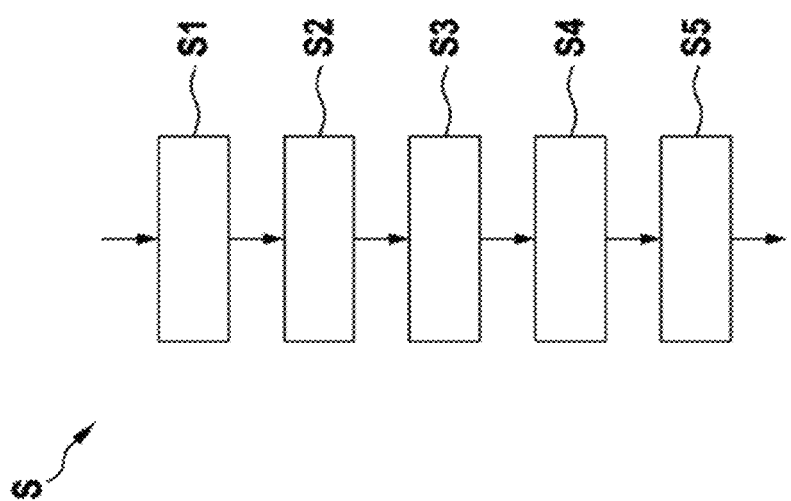
FIG. 1 shows schematically the structure of one embodiment of the communication method according to the invention in the form of a flow diagram.

FIG. 1 shows schematically the structure of one embodiment of the communication method S according to the invention in the form of a flow diagram.

In step S1 of the embodiment of the communication method S according to the invention shown in FIG. 1, a communication request is made by one of the mobile units which are denoted in the following figures with the reference numbers 10 and 20. In this connection, a communication request can be made, for example, if the driver of one vehicle as the first mobile device 10 initiates a data exchange with a vehicle driving in front as the second mobile device 20, for example in the sense of a vehicle-to-vehicle communication. This may be a data exchange, for example relating to the query of a current traffic situation or the like, but is not restricted thereto.

In step S2, a codebook, denoted below with the reference symbol $C_j$, which is characteristic of and determines and specifies an encoding-decoding unit, denoted below with the reference numbers 12, 22, is determined or specified on the basis of the communication request from step S1 in an external interface unit which is denoted with the reference number 30 in connection with the following figures. This determination of the codebook may only entail, for example, making a decision concerning the codebook $C_j$ which is intended to be used as a basis, and communicating this decision to the mobile units involved, for example by transmitting a value $\gamma_j$ (where e.g. $\gamma_j=j$), representing the codebook $C_j$, of a synchronization variable $\gamma$ or generally of a synchronization element which is denoted below with the reference number 52. The value $\gamma_j$ of the synchronization variable $\gamma$ can be the result of a random experiment.

This communication concerning the specified codebook $C_j$ is performed in the following step S3 of the communication method S shown in FIG. 1.

In step S4 of the embodiment of the communication method S according to the invention as shown in FIG. 1, following reception of the communication, a respective encoder, denoted below with the reference numbers 12-1, 22-1, and/or decoder, denoted below with the reference numbers 12-2, 22-2, which are assigned to the defining and specifying codebook $C_j$ and, combined in a respective mobile unit, can be understood as the encoding-decoding unit 12, 22 is/are selected in the respective involved mobile units 10, 20.

The actual communication between the mobile units 10 and 20 synchronized in this way then takes place according to step S5.

Due to the lack of knowledge of the actual form of the assignment between the codebooks $C_j$ of an underlying codebook library 50, which can also be referred to above and below as a codebook unit, the values $\gamma_j$ (where, for example, $\gamma_j=j$) of the synchronization variable $\gamma$ representing them and the retained plurality of encoding-decoding units 12, 22, in the case of external interference sources which are denoted below with the reference number 90, said interference sources, with their interference channels, denoted below with the reference number 91, cannot intervene in the actual communication between the mobile units 10 and 20. Said communication thus proceeds without interference.

Figure 2:
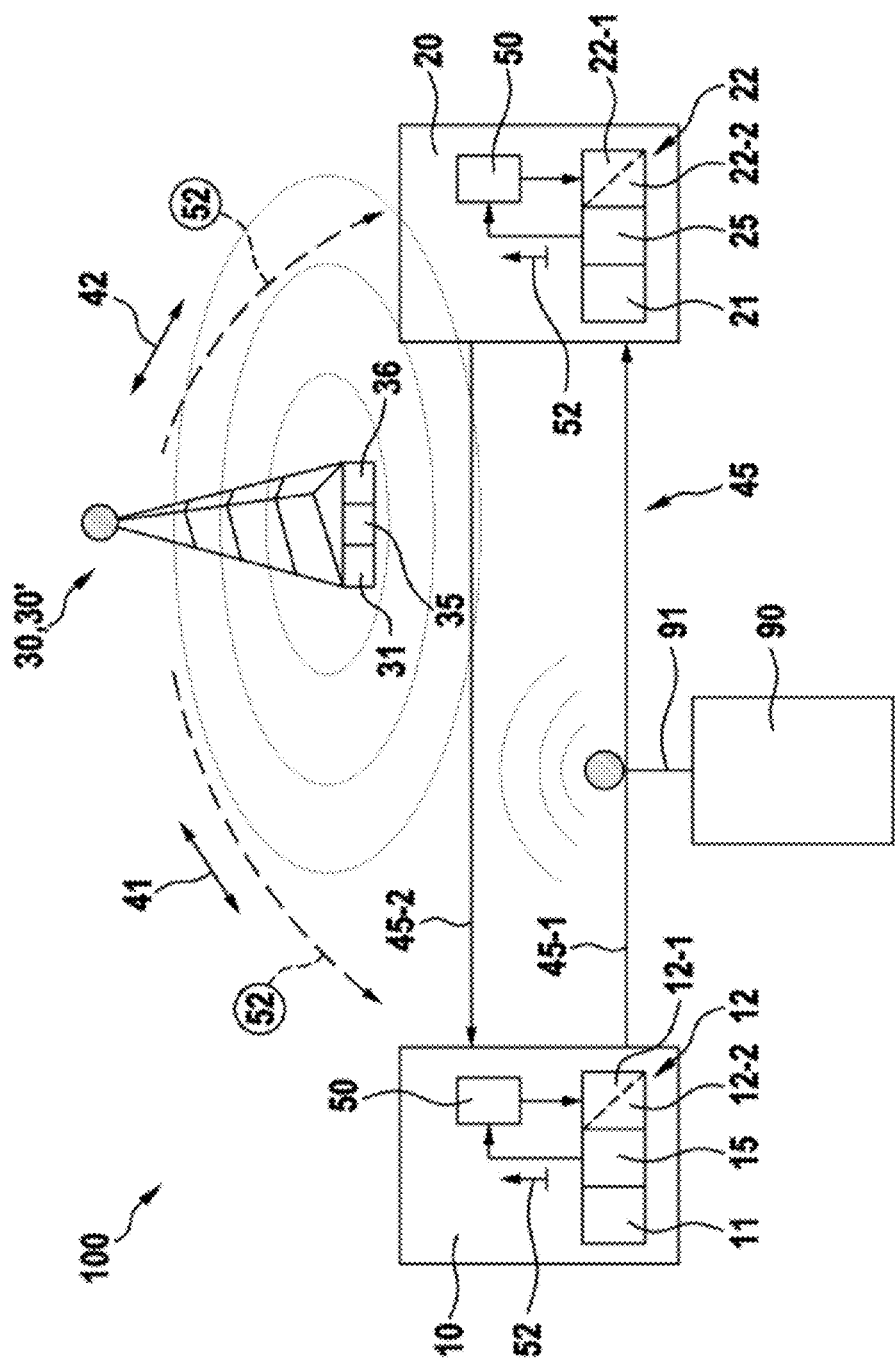
FIGS. 2 and 3 show schematically the structure of communication systems according to the invention which are configured for implementation and/or application using the communication method according to the invention on the basis of mobile units designed according to the invention and an interface unit designed according to the invention.
Figure 3:
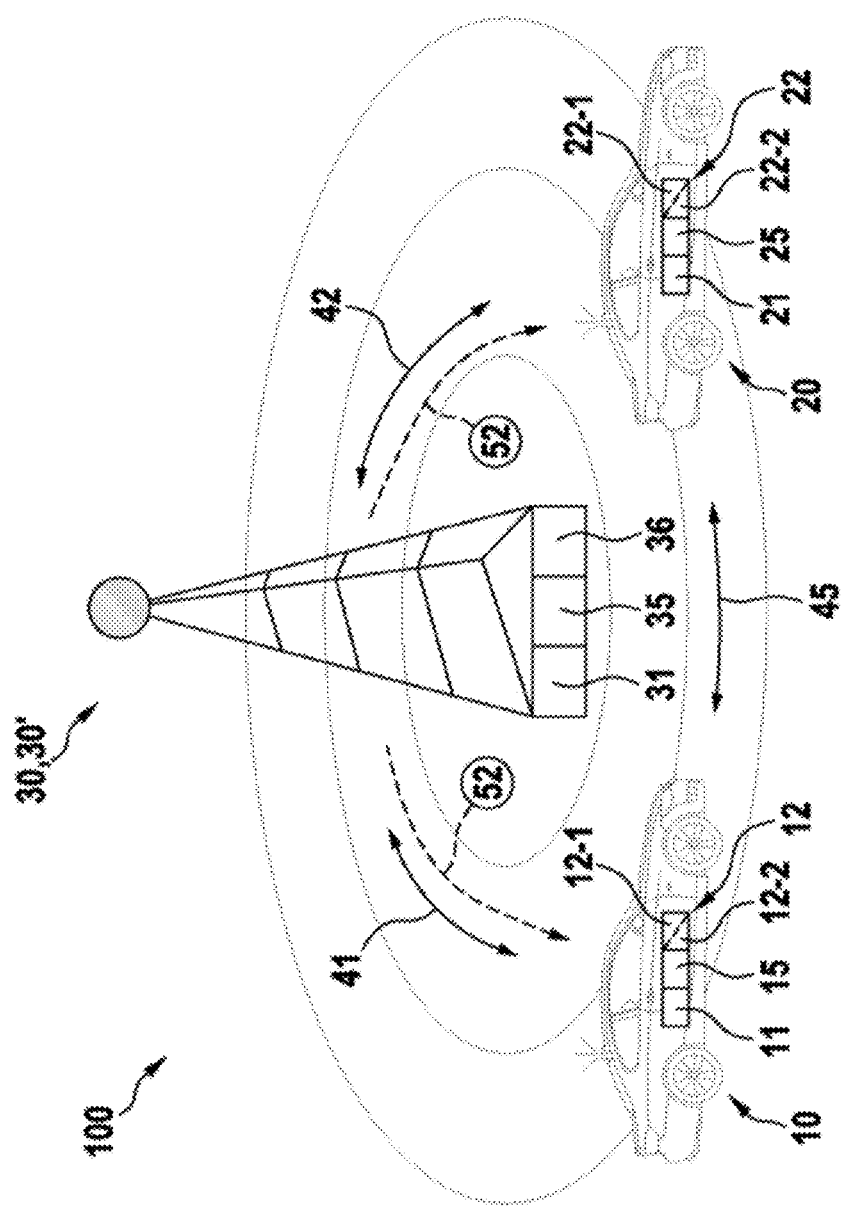

FIGS. 2 and 3 shows schematically the structure of communication systems 100 according to the invention which are configured for implementation and/or application using the communication method S according to the invention on the basis of mobile units 10 and 20 designed according to the invention and an external interface unit 30 designed according to the invention.

In the embodiments shown in FIGS. 2 and 3, the respective communication system 100 consists of the first mobile unit 10, for example a first vehicle, a second mobile unit 20, for example a second vehicle, and an interface unit 30 outside the mobile units 10 and 20 in the form of an external infrastructure component 30'.

The first mobile unit 10 has a first transceiver 11, a first encoding-decoding unit 12 with a first encoder 12-1 and a first decoder 12-2. A control unit 15 is further provided, with which the transceiver 11 and the selection and operation of the specific encoder 12-1 and decoder 12-2 are controlled in the first mobile unit 10.

The second mobile unit 20 correspondingly has a second transceiver 21, a second encoding-decoding unit 22 with a second encoder 22-1 and a second decoder 22-2. A control unit 25 is further provided, with which the transceiver 21 and the selection and operation of the specific encoder 22-1 and decoder 22-2 are controlled in the second mobile unit 20.

The interface unit 30 provided outside the first and second mobile units 10 and 20, for example by way of an external infrastructure component 30', similarly has a transceiver 31 and a control unit 35 by means of which, on the one hand, the reception and transmission are performed by means of the transceiver 31 and, on the other hand, the selection of a codebook Cj or a corresponding value γj (where, for example, γj=j) of a synchronization variable γ as a synchronization element 52 and consequently the determination and specification of the encoders 12-1, 22-1 and decoders 12-2, 22-2 are performed through selection by a provided selection unit 36 in the external interface unit 30.

The selection of the codebook Cj is instigated in the external interface unit 30 with interaction from the control unit 35 and the selection unit 36 on the basis of the communication request S1 described above from one of the mobile units 10, 20. The synchronization element 52 or the value of the synchronization element 52, for example the value γj (where, for example, γj=j) of the synchronization variable γ specified externally by the external interface unit 30, is transmitted to the mobile units 10 and 20 via the communication channels 41 and 42 between the interface unit 30 and the mobile units 10 and 20. Following the reception of the communication relating to the specified codebook Cj, i.e. in particular the value γj (where, for example, γj=j) of the synchronization variable γ, in the mobile units 10 and 20, the selection from the codebook library or codebook unit 50 is performed in said mobile units, mediated by the control units 15 or 25 exploiting the 1-to-1 assignment between the values γj (where, for example, γj=j) of the synchronization variable γ and the encoding-decoding units 12, 22 with the encoders 12-1, 22-1 and the decoders 12-2, 22-2.

Only then, following the specification of the encoding-decoding units 12, 22, is the direct communication channel 45 between the mobile units 10 and 20 established with incorporation of the subchannels 45-1, 45-2.

Figure 4:
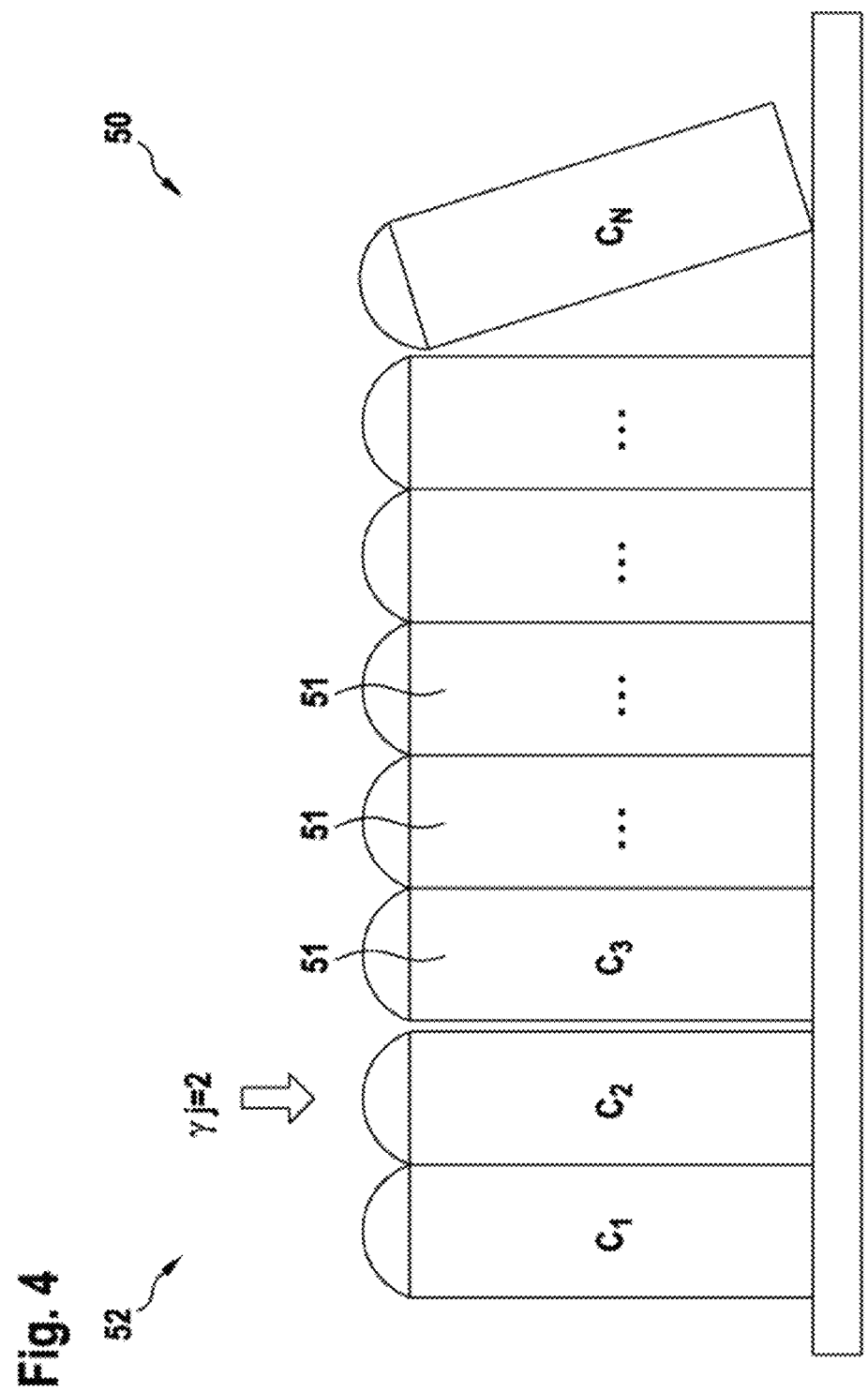
FIG. 4 shows schematically a codebook library with a plurality of codebooks.

FIG. 4 shows schematically a codebook unit 50 with a plurality of codebooks 51 which are also denoted individually as Cj, where j=1, 2, . . . N, wherein N is a finite natural number describing the number of existing codebooks Cj and therefore the number of different encoding-decoding units 12, 22. The 1-to-1 assignment between the values γj (where, for example, γj=j) of the synchronization variable γ and the different codebooks Cj is furthermore explained in FIG. 4.

Figure 5:
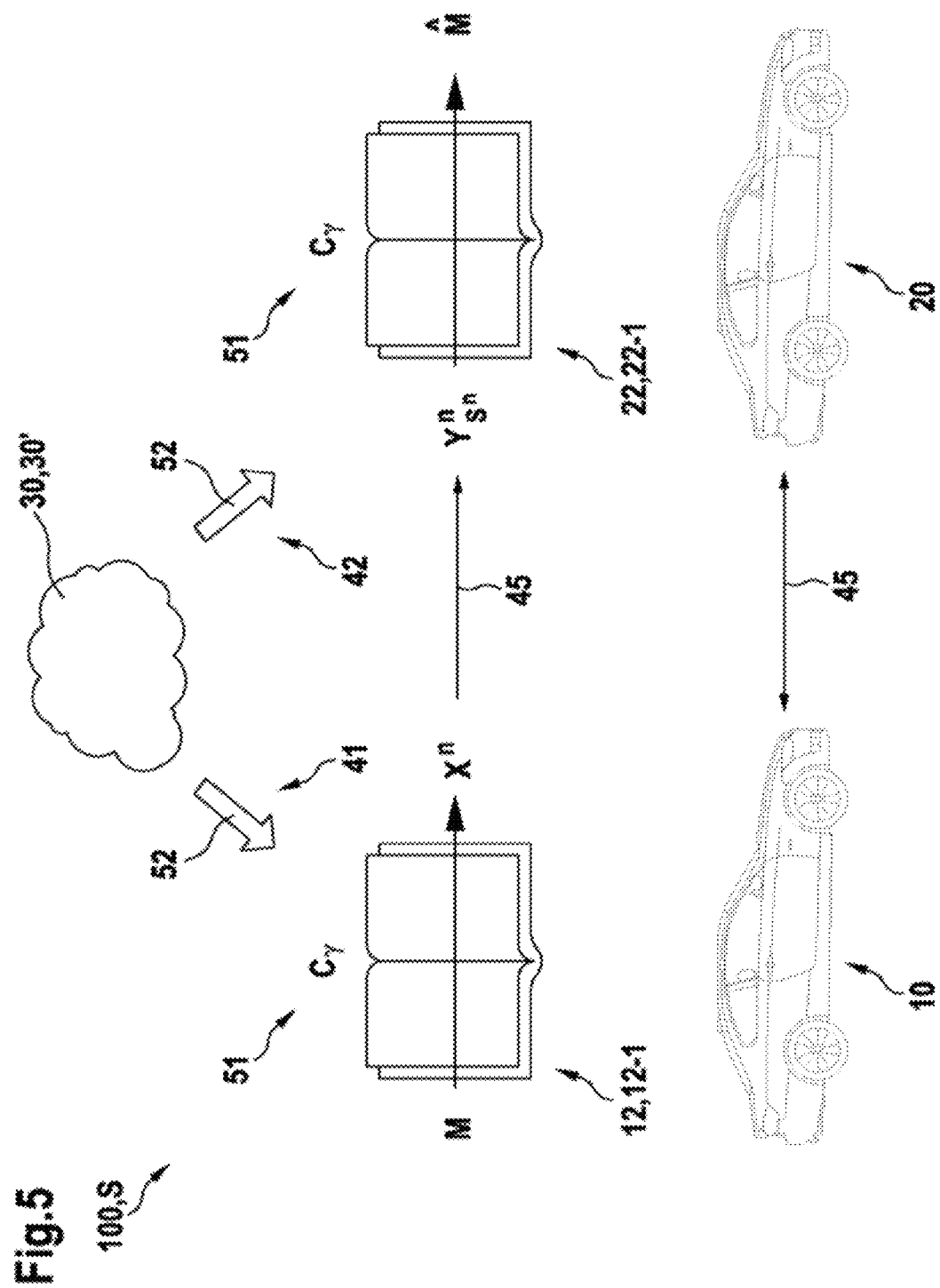
FIGS. 5 and 6 show schematically aspects of other embodiments of the communication system according to the invention and the communication method according to the invention.
Figure 6:
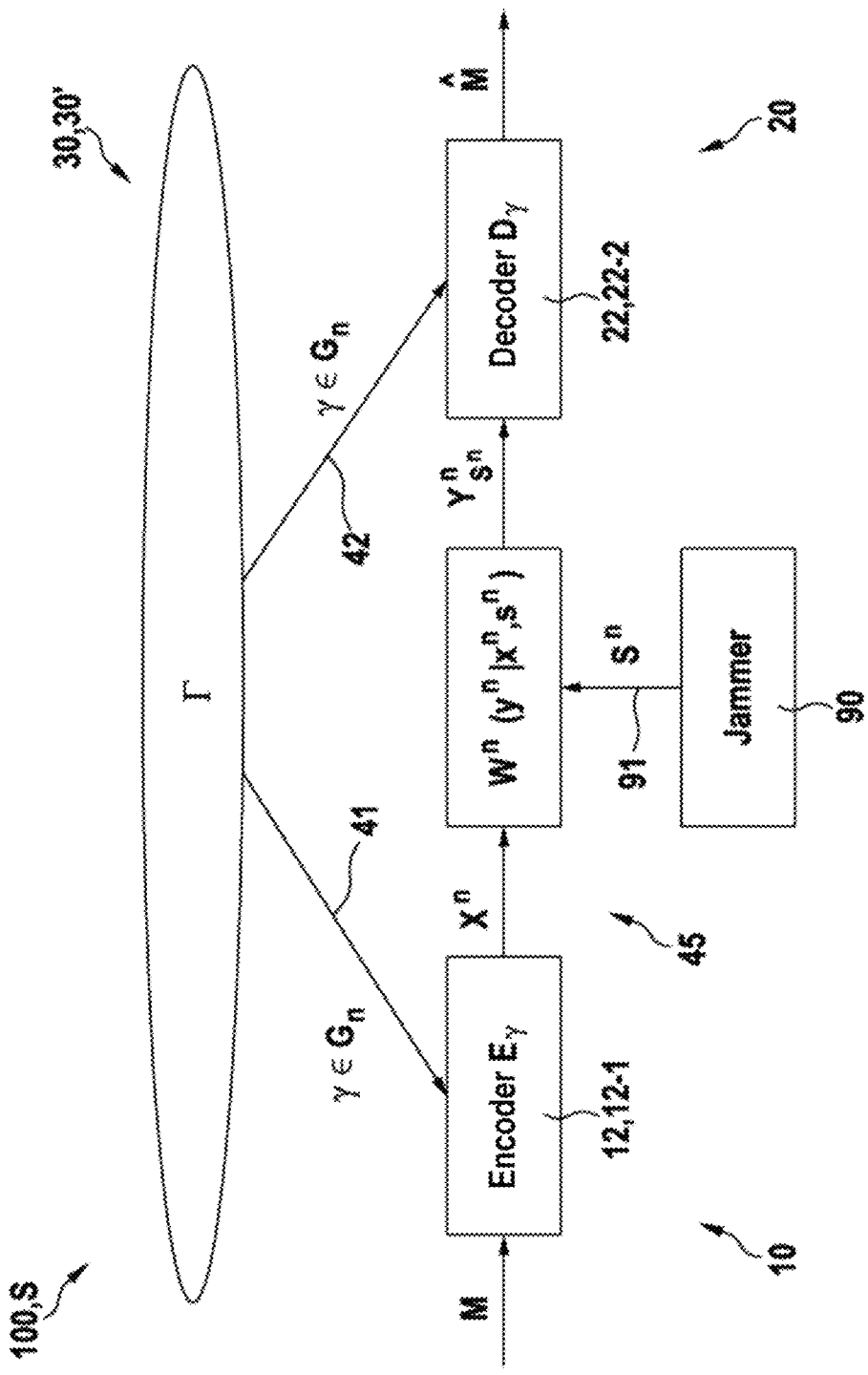

FIGS. 5 and 6 shows schematically aspects of other embodiments of the communication system 100 according to the invention and the communication method S according to the invention.

Following the transmission of the value γj (where, for example, γj=j) of the synchronization element 52 and in particular the synchronization variable γ to the mobile units 10 and 20 by the external interface unit 30 as an external infrastructure component 30', a corresponding codebook Cγ (corresponding to Cj, if γ has the value γj, for example γj=j) is selected and consequently the corresponding encoding-decoding units 12 and 22 are specified with a corresponding encoder 12-1 on the side of the first mobile unit 10 as the transmitter side and a corresponding decoder 22-2 on the side of the second mobile unit 20 as the receiver side in FIG. 5.

As a result, the direct communication channel 45 between the mobile units 10 and 20 is opened following synchronization by the external interface unit 30. The message M to be transmitted as the pre-image message by the encoder 12-1 is converted into an encoded message $X^n$, is transmitted via the channel 45 from the first mobile unit 10 to the second mobile unit 20, is received in the second mobile unit 20 as the transmitted message $Y_{S''}^n$ affected by interference from the external interference source or jammer 90 with the interference signal $S''$, and is converted through the action of the decoder 22-2 on the side of the second mobile unit 20 into the message $\hat{M}$ as the image message. In the ideal case, the pre-image image message M and the image message $\hat{M}$ are identical. In this optimal case, the message transmission is loss-free.

These and further aspects of the present invention will also be further explained on the basis of the following presentation:

The present invention also relates, in particular, to infrastructure-supported library synchronization and ensures a reliable communication with unknown interference in vehicle-to-x communication.

Secure and robust communication connections are among the most important prerequisites for information exchange for security reasons in vehicular ad-hoc networks (VANETs) and for upcoming applications, such as, for example, highly automated driving.

The following six possible attack scenarios, inter alia, exist for vehicle-to-vehicle (V2V) communication or in vehicle-to-infrastructure (V2I) communication:

Denial of Service (DoS),
Message Suppression Attack,
Fabrication Attack,
Changeation Attack,
Replay Attack and
Sybil Attack.

The following security requirements are derived from these scenarios: authentication, message integrity, non-repudiation, privacy, efficiency and service availability (SA).

Attention will be focused below on SA as a requirement for DoS attacks. Service availability SA also involves network availability if the connection is noisy or is actively interfered with by an attacker, for example by a jammer 90, or other parties communicating in an uncoordinated manner. The underlying prerequisite for securing SA is the presence of a robust communication channel and efficient encoding schemes to compensate for fading interference and disruptive interference and DoS.

The following restrictions exist in the conventional procedure on which the present invention is based:

Security attacks and DoS attacks have a severe impact on the proposed applications for V2I and V2V communication and, in a worst-case estimation, can result in system failure.

DoS attacks result in long delays between the transmission and successful reception of a data packet, or completely prevent the service if no retransmission method, for example no Automated Repeat Request (ARQ), is employed. There are many ways to deal with security in VANETs and jamming where, for example, hopping and channel switching are used as highly promising approaches to overcome jamming attacks. Nevertheless, hopping does not solve the problem completely and channel switching requires the use of a plurality of transceivers in the vehicle 10, 20. This is costly and only works if the interference signal 91 of the attacker 90 is restricted to a specific frequency band.

In information theory, a DoS attack is generally modelled by an interfering transmitter 90 as an arbitrarily varying channel (AVC) in which a state selector 90 (interfering transmitter) can determine the state of the communication channel 45. For the purposes of V2V and V2I concepts, a reliable communication must be guaranteed for every possible state selection.

A key problem of an AVC is that a manipulated and/or distorted output symbol of the communication channel 45 between the transmitter, for example the first mobile unit 10, and the legitimate receiver, for example a second mobile unit 20, could have the appearance of a valid codeword. This situation is referred to as symmetrizability. The interfering transmitter 90 or, more precisely, the state sequence of the channel can thus emulate a valid channel input. The decoder 22-2 has no opportunity to decide whether the received codeword actually matches the encoded message and therefore correctly decodes it. In this situation, the capacity of the communication connection is actually zero.

In addition, the latest communication systems are designed in relation to a mean error criterion. This means that a reliable communication is guaranteed for the majority of the transmitted messages. For applications which rely critically on a robust communication connection, such as, for example, security-oriented V2V communication, flexibility must be guaranteed for each message transmitted via the link. Encoding schemes operating reliably under a maximum error criterion are therefore a necessary prerequisite for future applications in vehicle communication.

Proposed Solution

The solution proposed by the invention uses the mobility which is present in a vehicle communication scenario in combination with a synchronization variable SV or $\gamma$ in order to coordinate the selection of the encoder 12-1, 22-1 or E$\gamma$ and of the decoder 12-2, 22-2 or D$\gamma$ which are predefined in conventional approaches.

This coordination method is based on a coordination resource which may, for example, be a transmit signal. A prerequisite for correct operation is that both parties or vehicles, i.e. both mobile units 10 and 20 in the example shown in the figures, involved in the communication connection transfer the source of the radio signal at a minimal distance. A high-performance connection can thus be set up for the synchronization. This scenario is achieved, for example, on a highway, where an interface unit 30 is located in the immediate vicinity as a mobile access point, as a base station or as a roadside unit. The mobility of the communicating parties 10, 20 can thus be understood as an important guarantee for the proposed scheme. An information-theory block diagram of the communication channel is shown in FIG. 6.

FIG. 6 shows a block diagram for the library synchronization for communication amidst arbitrarily varying noise.

The probability mass function W which characterizes the relationship between an input sequence $x^n$ and an output sequence $y^n$ is denoted $W^n(y^n|x^n,s^n)$. In addition, $s^n \in S^n$ is the state realization of the communication channel 91 which is selected by the interfering transmitter 90. The aim of the proposed system is reliable reception and reconstruction of the message M, i.e. with the aim of guaranteeing M=$\hat{M}$ for each selection of $s^n$.

The synchronization variable SV or $\gamma$ as the synchronization element 52 and as the resource can be generated with separate but correlated signals which result from noise-affected versions of a radio signal or other environment parameter.

The corresponding infrastructure-supported scheme is shown in FIG. 2. Here, the infrastructure component 30' as the external interface unit 30 may, for example, be a traditional base station of a radiocommunication network or a roadside unit for vehicle connectivity.

FIG. 2 therefore shows an example scenario of the infrastructure-supported library synchronization proposed according to the invention in the sense of a synchronization according to the invention of first and second mobile units 10 and 20 via an external interface unit 30 which effects the selection of a codebook Cj to define and specify the corresponding encoding-decoding units 12, 22 in the mobile units 10, 20.

Once the synchronization between the transmitter, i.e., for example, the first mobile unit 10, and the receiver, for example the second mobile unit 20, is completed, the synchronization variable SV or $\gamma$ is used as the synchronization element 52 in order to "heal" the jammed or distorted communication connection by selecting a suitable codebook Cj from the codebook library, conceived as the codebook unit 50. This is achieved through the use of the synchronization variable SV or $\gamma$ in order to select a suitable codebook Cj from the library 50 at the encoder 12-1, 22-1 and the decoder 12-2, 20-2.

According to the adaptive modulation method, the proposed scheme implements an adaptive codebook selection method.

Finally, according to a different perspective of the present invention, the proposed communication method S according to the invention uses the following phases:

Phase 1: Synchronization—Generation of a value $\gamma j$ (for example where $\gamma j = j$) of a common synchronization variable $\gamma$ as the synchronization element 52.

Phase 2: Codebook selection—Selection of the codebook Cj from the library 50 on the basis of the value $\gamma j$ (for example where $\gamma j = j$) of the synchronization variable $\gamma$.

Phase 3: Information exchange—Communication with adaptively selected (according to SV) codebook Cj with corresponding encoder/decoder 12-1, 12-2; 12-2, 22-2.

The procedure described above is visualized for a V2V information exchange process which is shown in FIG. 3.

FIGS. 3 to 5 show a library-synchronization-based V2V communication process as an embodiment of the communication method S according to the invention.

Since the synchronization variable SV or γ is not known to the jammer 90, it is not possible for it to adapt its state selection strategy in order to interfere with the communication between the mobile units 10 and 20 supported by the synchronization variable SV or γ.

A reliable communication via the channel 45 between the mobile units 10 and 20 is achieved and can also be guaranteed with the proposed scheme, provided that sufficient synchronization resources are available on both sides.

In addition, the proposed scheme can be used for secret key generation in order to enable a secure communication in the presence of a wiretapper.

The proposed invention offers the following advantages:

The present invention is based on physical and information-theory principles.

Efficacy in terms of robustness against DoS attacks is therefore measurable and can be derived from physical quantities. The proposed scheme enables monitoring of the mean value of the error probability and also of the maximum error (for a discussion, see restrictions of the current prior art). A reliable communication can thus be guaranteed for each message. This capability is inherent in the proposed scheme and in a facility for security-related communication, such as, for example, for the transmission of a warning or a signal for sharp braking or an intersection collision warning. In addition, secure and robust protocols for certification and standardization can be developed on the basis of the proposed concept, meeting the requirements for particularly reliable connectivity for highly automated driving or safety message exchange in VANETs. It is proven from the underlying information-theory relationships that the proposed invention which is based on library synchronization is the only possibility for ensuring reliable communication in arbitrarily varying channels, i.e. if the communication connection 45 is influenced by arbitrarily varying noise or other type of interference signal.

Along with the above written description of the invention, explicit reference is made herewith to the diagrammatic representation of the invention in FIGS. 1 to 6 for its supplementary disclosure.

REFERENCE NUMBER LIST 10 (First) mobile device, (first) vehicle
11 Transceiver
12 Encoding-decoding unit, encoder-decoder
12-1 Encoder
12-2 Decoder
15 Control unit
20 (Second) mobile device, (second) vehicle
21 Transceiver
22 Encoding-decoding unit, encoder-decoder
22-1 Encoder
22-2 Decoder
25 Control unit
30 (External) interface unit
30' Infrastructure component, base station, hotspot
31 Transceiver
35 Control unit
36 Selection unit
41 Communication channel to the interface unit 30
42 Communication channel to the interface unit 30
45 Communication channel between mobile units 10, 20
45-1 Subchannel
45-2 Subchannel
50 Codebook library, codebook unit
51 Codebook
52 Synchronization element
90 Interfering unit, jammer
91 Interfering channel
100 Communication system
Cj Codebook
S Communication method
Communication request from a mobile unit 10, 20
S2 Determination of a defining codebook Cj in the external interface unit 30
S3 Communication of the defining codebook Cj from the external interface unit 30 to the mobile units 10, 20
S4 Selection of an encoder 12-1, 22-1/decoder 12-2, 22-2 for the defining codebook Cj in the mobile units 10, 20
S5 Communication between the mobile units 10, 20
γ Synchronization variable
γj Value of the synchronization variable γ/synchronization element 52

The invention claimed is:

1. A communication method (S) for communication between mobile units (10, 20), the method comprising:
  determining (S2), by an external interface unit (30), a defining codebook (Cj), wherein the defining codebook (Cj) defines or specifies at least one of an encoder (12-1, 22-1) and a decoder (12-2, 22-2);
  communicating the defining codebook (Cj) to mobile units (10, 20);
  synchronizing communication (S3) between the mobile units (10, 20) with the external interface unit (30), wherein the external interface unit (30) is outside the mobile units (10, 20); and
  subsequent to the synchronizing communication, communicating (S5) information between the mobile units (10, 20), wherein the communicating information includes at least one of encoding information transmitted between the mobile units (10, 20) on a transmitter side by means of the encoder (12-1, 22-1) and decoding information transmitted between the mobile units (10, 20) on a receiver side by means of a decoder (12-2, 22-2); wherein
  the determining (S2) includes specifying by the external interface unit (30) a value (γj) of a determining synchronization element (52) that determines the defining codebook (Cj), and
  the communicating (S3) information to the mobile units (10, 20) is performed through the transmission of the value (γj) of the determining synchronization element (52) from the external interface unit (30) to the mobile units (10, 20).

2. The communication method (S) of claim 1, wherein the determining (S2) is based on at least one of an at least partially deterministic algorithm, a random algorithm, and a pseudorandom algorithm.

3. The communication method (S) of claim 1, wherein the synchronization element (52) is a synchronization variable (y), and the communicating (S3) information to the mobile units (10, 20) is performed through the transmission of the synchronization variable (y) from the external interface unit (30) to the mobile units (10, 20).

4. The communication method (S) of claim 1, wherein the determining (S2) includes selecting the defining codebook (Cj) from a discrete plurality of defining codebooks (Cj) from a codebook library (50).

5. The communication method (S) of claim 4, wherein the discrete plurality of possible defining codebooks (Cj) are in a 1-to-1 correspondence with a corresponding plurality of encoders (12-1, 22-1) and/or decoders (12-2, 22-2).

6. The communication method (S) of claim 4, wherein the discrete plurality of possible defining codebooks (Cj) are in a 1-to-1 correspondence with a corresponding plurality of underlying encoding-decoding units (12, 22).

7. The communication method (S) of claim 4, wherein the mobile units (10, 20) select a corresponding defining codebook (Cj) from the codebook library (50) on the basis of the defining codebook (Cj) communicated by the external interface unit (30), and further wherein the defining codebook (Cj) is predefined in the respective mobile unit (10, 20) with a corresponding plurality of possible defining codebooks (Cj) that define and specify the encoder (12-1, 22-1) and the decoder (12-2, 22-2) of the respective mobile unit (10, 20).

8. The communication method (S) of claim 4, wherein the determining (S2) includes selecting the defining codebook (Cj) by selecting a corresponding selection of a value ($\gamma j$) for the determining synchronization element (52) and a synchronization variable ($\gamma$) from a discrete number of values.

9. The communication method (S) of claim 8, wherein a plurality of possible values ($\gamma j$) for the determining synchronization element (52) and the synchronization variable ($\gamma$) are in a 1-to-1 correspondence with a corresponding plurality of encoders (12-1, 22-1) and/or decoders (12-2, 22-2).

10. The communication method (S) of claim 8, wherein a plurality of possible values ($\gamma j$) for the determining synchronization element (52) and the synchronization variable ($\gamma$) are in a 1-to-1 correspondence with a corresponding plurality of underlying encoding-decoding units (12, 22).

11. The communication method of claim 8, wherein the mobile units (10, 20) select a corresponding defining codebook (Cj) on the basis of the value ($\gamma j$) of the determining synchronization element (52), and in particular the synchronization variable ($\gamma$), communicated by the external interface unit (30), and further wherein the defining codebook (Cj) is predefined in the respective mobile unit (10, 20) with a corresponding plurality of possible defining codebooks (Cj) that define and specify the encoder (12-1, 22-1) and the decoder (12-2, 22-2) of the respective mobile unit (10, 20).

12. A mobile unit (10, 20), comprising:
a transceiver (11, 21) configured to communicate with other mobile units (10, 20) and an external interface unit (30);
an encoding-decoding unit (12, 22); and
a control unit (15, 25) configured to control the transceiver (11, 21) and the encoding-decoding unit (12, 22) utilizing the communication method (S) of claim 1.

13. The mobile unit (10, 20) of claim 12, wherein the mobile unit is a motor vehicle.

14. An external interface unit (30), comprising:
a transceiver (31) configured to communicate with mobile units (10, 20) outside of the external interface unit (30); and
a control unit (35) configured to control the transceiver (31) utilizing the communication method (S) of claim 1.

15. The external interface unit (30) of claim 14, wherein the transceiver (31) is further configured to communicate with other external interface units (30), and further wherein the control unit (35) is configured to control the transceiver (31).

16. The external interface unit (30) of claim 14, wherein the external interface unit (30) is designed as at least one of an external infrastructure component (30'), a base station device, a hotspot, a roadside unit, a roadside unit according to a dedicated short-range communications (DSRC) standard, a mobile device of a wireless transmission system, and a mobile device of a mobile radiocommunication network.

17. A communication system (100), comprising:
at least one first mobile unit (10) and at least one second mobile unit (20), wherein each of the at least one first mobile unit (10) and the at least one second mobile unit (20) comprises:
a mobile unit transceiver (11, 21) configured to communicate with other mobile units (10, 20) and an external interface unit (30);
a mobile unit encoding-decoding unit (12, 22); and
a mobile unit control unit (15, 25) configured to control the mobile unit transceiver (11, 21) and the mobile unit encoding-decoding unit (12, 22) utilizing the communication method (S) of claim 1; and
an external interface unit (30), comprising:
an external interface unit transceiver (31) configured to communicate with the at least one first mobile unit (10) and the at least one second mobile unit (20) outside of the external interface unit (30); and
an external interface unit control unit (35) configured to control the external interface unit transceiver (31) utilizing the communication method (S) of claim 1.

18. The communication system (100) of claim 17, wherein the at least one first mobile unit (10) and the at least one second mobile unit (20) are motor vehicles.

* * * * *